United States Patent Office 3,359,866
Patented Dec. 26, 1967

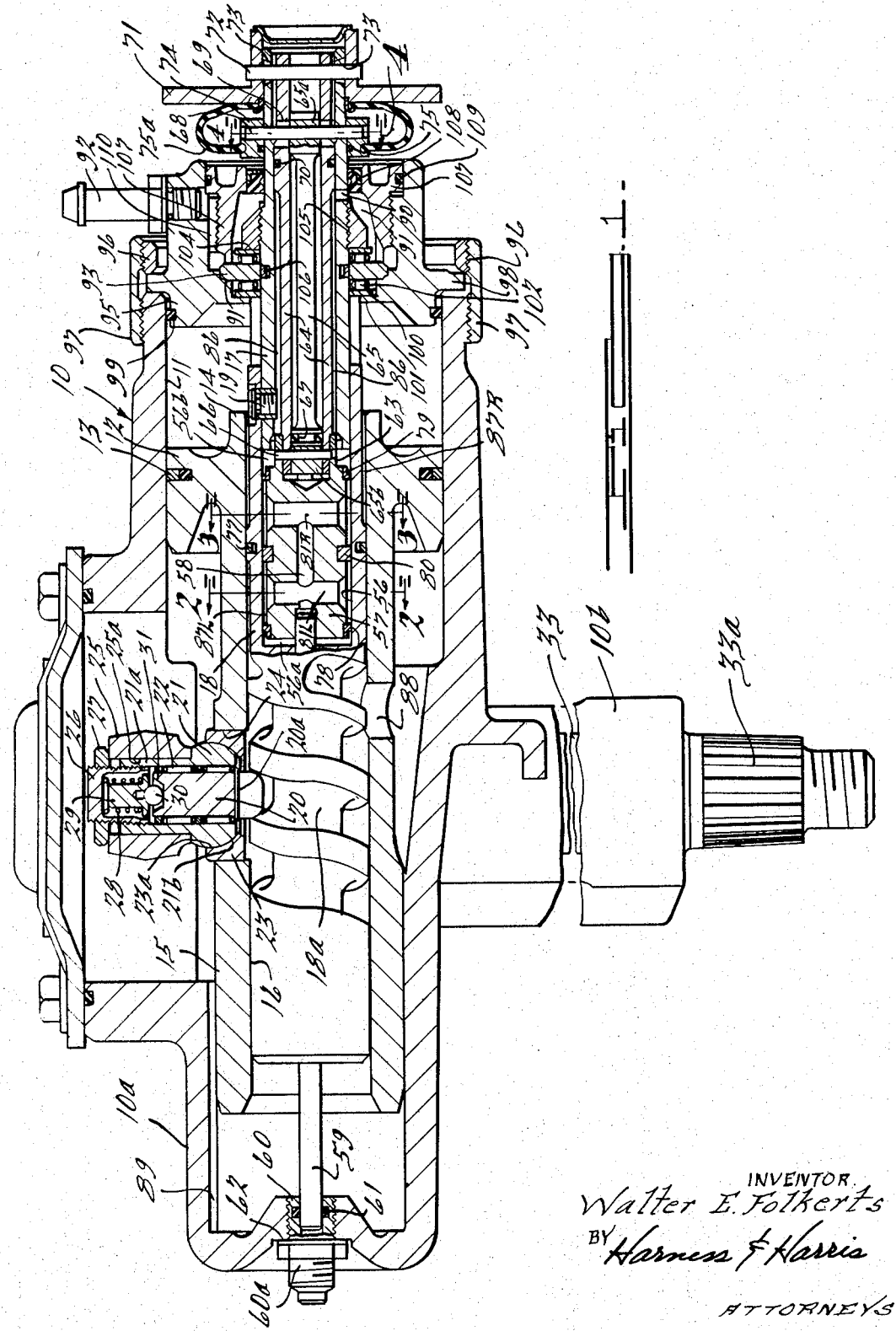

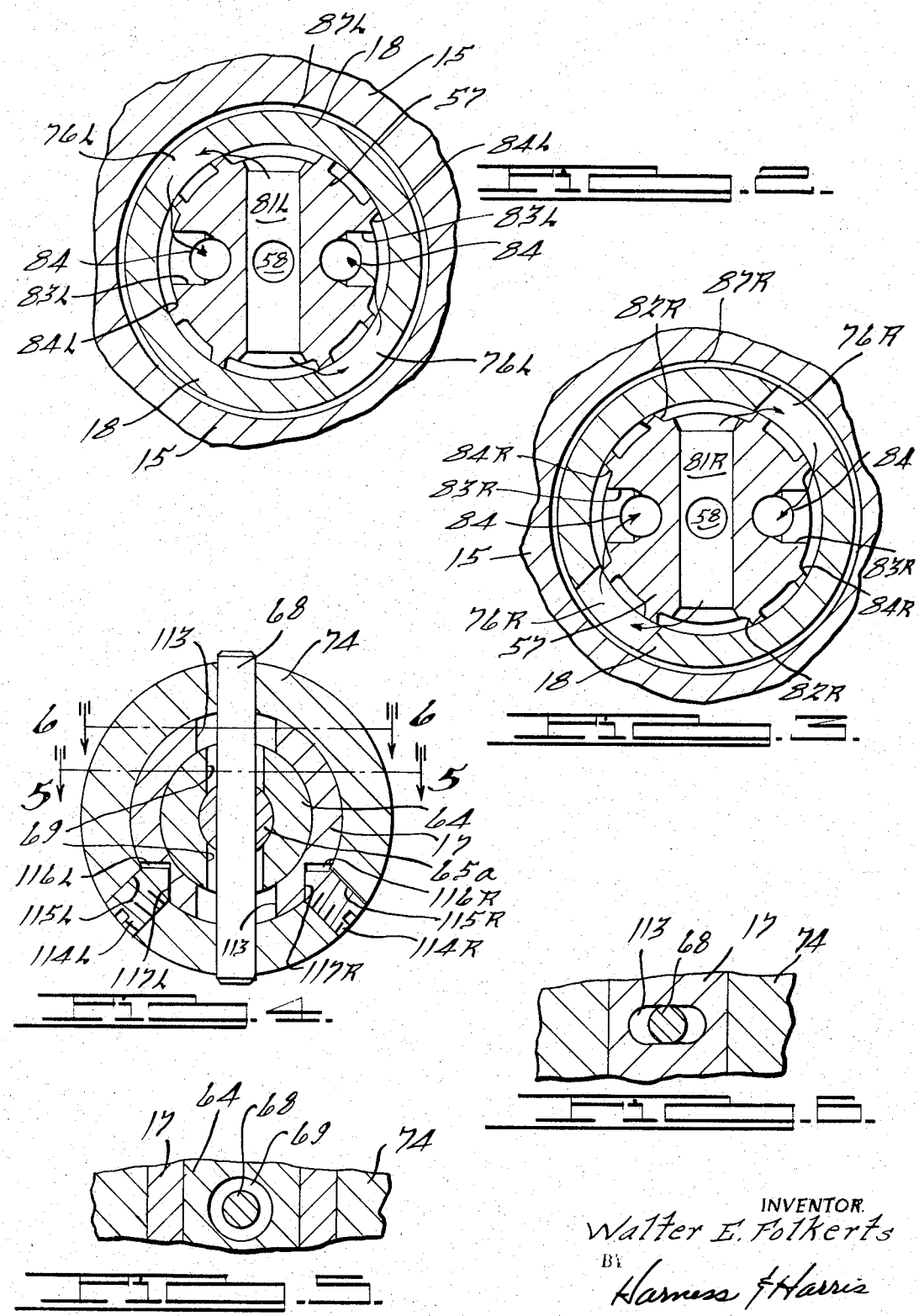

3,359,866
POWER STEERING GEAR
Walter E. Folkerts, Hazel Park, Mich., assignor to Chrysler Corporation, Highland Park, Mich., a corporation of Delaware
Filed Dec. 28, 1965, Ser. No. 516,911
7 Claims. (Cl. 91—375)

In one type of power steering gear, a rotatable worm is operatively connected with the outer end of a swinging crank arm of a cross shaft or rock shaft, which in turn is operatively connected with the dirigible wheels of the vehicle to steer the same. A fluid operated motor operatively coupled with the gear to provide power assist for the steering movement is controlled by a rotary valve which in turn is connected with a manually rotatable steering shaft, whereby the power assisted steering movement is controlled.

An important object of the present invention is to provide such a gear having improved simplified means for accomplishing a fine adjustment of the rotary valve so as to achieve a particularly efficient and responsive steering control for the vehicle.

Another object is to provide such a gear having one end of a torsion rod operatively connected to the rotary valve and steering shaft and having the opposite end of the torsion rod adjustably connected to a driven shaft comprising an integral extension of the worm, whereby rotation of the valve independently of the worm extension is enabled upon deformation of the torsion rod and rotation of the steering shaft.

Another object is to provide such a gear wherein the worm extension comprises a tubular driven shaft having the valve rotatable coaxially therein, the steering shaft comprises a tubular valve driving shaft extending coaxially within the driven shaft, and the torsion rod extends coaxially within the driving shaft with its one end adjacent the valve, said one end and driving shaft being operatively secured to the valve for rotation as a unit therewith. The opposite end of the torsion rod is keyed by means of a diametrical pin and a valve adjustment mechanism to the driven shaft for rotation as a unit therewith, the pin extending through radial lost motion holes in the driving and driven shafts to enable limited rotational adjustment of the pin and connected opposite end of the torsion rod relative to these shafts about the common axis of the latter and is secured to an adjustment collar rotatably mounted coaxially on the exterior of driven shaft. A pair of circumferentially spaced screws are adjustably screwed radially through the collar at circumferentially spaced locations into recesses in the driven shaft, each recess being defined in part by a cam wall of the driven shaft, the two cam walls of the two recesses being mirror images of each other and having the inner ends of the screws seated thereagainst. Each cam wall cooperates with the screw seated thereat to cam the adjusting collar circumferentially with respect to the driven shaft about the axis of the latter upon tightening of that screw, so that the adjusting collar is rotatably adjusted with respect to the driven shaft upon loosening of one screw and tightening of the other. By virtue of the pin connecting the collar and said opposite end of the torsion rod, and the valve connected to the aforesaid one end of the torsion rod, rotational adjustment of the collar similarly adjusts the angular position of the valve so as to achieve a precise angular relationship between the valve and driven shaft.

Other objects of this invention will appear in the following description and appended claims, reference being had to the accompanying drawings forming a part of this specification wherein like reference characters designate corresponding parts in the several views.

FIGURE 1 is a cross sectional view of a steering gear embodying the present invention, taken generally along the axis of the driven shaft and worm gear and showing the rotary valve in the neutral position.

FIGURE 2 is an enlarged transverse section through the valve, taken in the direction of the arrows, substantially along the line 2—2 of FIGURE 1.

FIGURE 3 is an enlarged transverse sectional view through the valve, taken in the direction of the arrows substantially along the line 3—3 of FIGURE 1.

FIGURE 4 is an enlarged transverse sectional view through the valve adjustment means, taken in the direction of the arrows substantially along the line 4—4 of FIGURE 1.

FIGURE 5 is a sectional view taken in the direction of the arrows substantially along the line 5—5 of FIGURE 4.

FIGURE 6 is a sectional view taken in the direction of the arrows substantially along the line 6—6 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings a particular embodiment of the present invention is illustrated by way of example in a hydraulically actuated steering gear for an automobile comprising a housing 10 having a cylindrical bore 11 in which a fluid pressure actuated piston 12 is reciprocable. An annular seal 13 around the periphery of the piston 12 cooperates with the latter to partition the bore 11 into left and right parts. The piston 12 is provided with integral tubular coaxial guide extensions 14 and 15 extending to the right and left respectively and cooperating to effect a bore 16 extending axially through the entire piston structure. The left extension 15 slides axially in guided relation within a cylindrical extension 10a of the housing 10.

A two part tubular driven shaft is rotatably supported within the bore 16 and comprises an outer shaft 18 and a coaxial inner shaft 17 snugly interfitting to complete a fluid tight seal therebetween and securely keyed together by a pin 19 for rotation as a unit. The left end of shaft 18 comprises an integral worm gear 18a which may have a variable or constant pitch and which is engaged by a rotatable follower pin 20 having a tapered nose adapted to ride along the spiral groove of the worm 18a upon rotation of the latter. The follower 20 is journaled in a ball element 21 by means of needle bearings 22 which seat against an annular flange 20a of the follower 20 immediately above the latter's nose. The ball element 21 has a stem 21a coaxial with the axis of rotation of the pin 20, and an integral spherical ball portion 21b seated in a mating spherical socket 23a of an annular socket element 23. The latter is carried by and fixed with respect to the extension 15 by being pressed tightly into a mating opening within shaft extension 15. The follower 20 extends through the center of ball 21b, and when at a particular steering position described below, coaxially through the annular socket 23 and radially toward the axis of rotation of worm 18.

The stem 21a extends tightly into a bore 25a in the swinging end of a crank arm 25 which is secured firmly against the enlargement of a ball 21b by means of a nut 27 screwed tightly on a hollow cap screw 26 and against arm 25. The screw 26 screws into the internally threaded outer end of stem 21a and provides a seat for a coil spring 28 compressed axially of the follower 20 against an annular shoulder of a pilot 29. The inner end of the pilot 29 provides a spherical socket for an anti-friction ball 30, which in turn seats within an outwardly opening depression 31 in the outer end of follower 20, whereby the latter is urged in the direction of its axis into engagement with the groove of worm 18a. The needle bearings 22 are retained in an annular bearing race confined between the lower or inner end of cap screw 26 and the enlargement 20a.

The swinging arm 25 extends perpendicularly to the axis of the worm 18a to the rock shaft 33 when the steering mechanism is in the straight ahead steering position illustrated in FIGURE 1 and is preferably formed integrally with the rock shaft 33. The latter is pivotal about an axis transverse to the axis of the worm and is journaled in a housing extension 10b. The left end of rock shaft 33 comprises a tapered spline 33a adapted to be connected with the customary linkage for steering the vehicle ground engaging wheels. Reference is made to applicant's aforesaid copending application for details of the mounting and operation of the ball and socket coupling for follower 20 and of crank arm 25 and shaft 33.

At the neutral or straight ahead steering position, FIGURE 1, the follower 20 lies one side of the axial plane of worm 18a which is also parallel to the axes of shaft 33 and follower 20, and crosses this plane as the follower 20 swings about the axis of shaft 33 and moves in either direction from the neutral position toward the limit of steering movement. In order to prevent axial movement of follower 20 with respect to crank arm 25, the cam contour of the worm 18a is dimensioned so that the distance from the point of contact between follower 20 and worm 18a to the center of ball element 21b is constant throughout the steering movement. The center of ball element 21b will swing around the axis of worm 18a at a constant radius upon rotation of sleeve 15 coaxially around worm 18a during operation. Hence the axis of follower 20 will remain parallel to the axis of shaft 33 throughout the steering movement and all parts of the follower 20 will remain fixed with respect to the center of the ball element 21b, which is also the center of pivotal movement enabled by the ball and socket coupling comprising the ball element 21b seated on the spherical surface 23a of socket 23. No relative axial movement of follower 20 with respect to crank arm 25 will take place and the tension of spring 28 urging follower 20 against worm 18a will remain unchanged, resulting in a uniform steering feel and returnability throughout the steering movement. As the center of the ball element 21b moves around the axis of worm 18a in a path of constant radius, the resulting slight axial movement of follower 20 with respect to the axis of worm 18a will be accommodated by axial movement of shaft 33 against the tension of a suitable spring.

Rightward of the worm 18a, FIGURE 1, the bore of the integral tubular shaft 18 enlarges at 56 to provide coaxial enclosure for a freely rotatable hollow cylindrical valve spool 57 having an inner chamber 58 closed at its right end and opening leftwardly to communicate with a source of pressurized fluid by means of a supply conduit 59 which extends axially through the worm 18a and tightly into fluid sealing engagement into the left end of the rotary valve spool 57 to rotate as a unit therewith. The conduit 59 passes freely through the bore of the worm 18a so as to rotate independently thereof. The left end of conduit 59 extends rotatably into the right end of a tubular fitting 60 screwed into the housing extension 10a and adapted externally at 60a for connection with a source of pressurized fluid, as for example the outlet of a power steering pump. Annular seals 61 and 62 around the conduit 59 and fitting 60 prevent axial endwise leakage of pressurized fluid from the housing extension 10a.

The right end of chamber 58 is closed by an integral end portion of spool 57 which in turn has a rightwardly opening socket portion 63 of reduced external diameter connected by means of a diametric pin 66 to the left end of a tubular valve actuator or driving shaft 64 and the enlarged left end 65b of a coaxial inner torsion rod 65 for rotation as a unit therewith. A suitable annular seal 67 around the enlargement 65b prevents axial leakage of hydraulic fluid from the bore of shaft 17 and return conduits 84, described below, into the bore of the tubular driving shaft 64.

The torsion rod 65 extends coaxially within the valve actuator or driving shaft 64 and terminates in an enlarged end 65b keyed to the outer driven shaft 17 by means of a pin 68. The latter extends through diametrically spaced and circumferentially extending lost motion slots 69 in the driving shaft 64, which allow approximately 8° of rotation of the driving shaft 64 in either direction from a neutral straight ahead steering position before the driving shaft 64 engages the pin 68. A suitable annular seal 70 around the driving shaft 64 prevents axial end-wise leakage of hydraulic fluid between the latter and shaft 17.

The driving shaft 64 is operably connected to the customary manually actuated steering wheel of the automobile by means of a steering shaft and universal coupling including a hub member 71 and diametrical pin 72 as part thereof. The latter extends through hub 71 and the right end of driving shaft 64 to key these together for rotation as a unit. Similarly to the lost motion slots 69, diametrically spaced lost motion slots 73 are provided in the right end of driven shaft 17 for passage of the pin 72, so that upon rotation of the latter about the common axis of the shafts 17 and 64, the shaft 64 will rotate approximately 8° from the neutral position before the pin 72 engages the driven shaft 17. Thus the pin 72 comprises the main manual driving connection between the automobile steering wheel and driven shaft 17 in the event of hydraulic power failure. The opposite ends of pin 68 extend radially through a valve adjustment ring 74, described below. The latter is covered by a flexible dirt shield 75a clamped to shaft 17 by hub 71 and cooperable with an annular seal 75 between shaft 17 and ring 74 to shield the adjustment mechanism of ring 74 from dirt.

In operation of the device described thus far, upon rotation of the manual steering wheel so as to rotate pin 72 and in turn rotate shaft 64 about its longitudinal axis, the rotation of shaft 64 will be imparted directly to the valve spool 57 to rotate the latter and thereby to direct pressurized fluid either to the left or right side of piston 12 as described below so as to reciprocate the piston 12 and thereby rotate worm 18a and rock shaft 33 in the direction to effect the desired turn. Rotation of the driving shaft 64 will be yieldingly resisted by the torsion rod 65 connected at its right end to the driven shaft 17 by pin 68. This resistance will be determined by the road reaction on the dirigible wheels of the vehicle which resists turning of the rock shaft 33 and thereby resists rotation of gear 18a and shaft 17. In the event of hydraulic power failure, torsion rod 65 will either cause rotation of the driven shaft 17 directly if the road reaction is comparatively light, as for example during high speed driving, or the left end of torsion rod 65 will rotate with driving shaft 64 approximately 8° with respect to the driven shaft 17, in which event pin 72 will engage driven shaft 17 to rotate the latter and worm 18a to effect manual steering.

In order to effect hydraulic power steering, the shaft 18 is provided with two pairs of axially spaced work ports or openings 76L and 76R at the region of the valve spool 57 and spaced by an annular seal 77 between the circumference of shaft 18 and the interior of sleeve 15 to cooperate with piston 12 in partitioning the cylinder 11 into the aforesaid left and right parts, FIGURES 1, 2 and 3.

An annular sealing land 78 is provided around the periphery of valve 57 adjacent its left edge in FIGURE 1 to engage the interior of bore 56 and prevent leakage of pressurized fluid into the valve porting system described below. Similar lands 79 and 80 are provided at the right edge and center respectively, of valve 57, the land 80 spacing the ports 76L and 76R and being formed in two halves to facilitate assembly on the valve 57, whereas the lands 78 and 79 are annular and are pressed onto the ends of valve 57.

Communicating with the chamber 58 and extending diametrically through the circumferential sidewall of the valve 57 at the regions of the work openings 76L and 76R respectively are two axially spaced supply ports 81L and 81R, which terminate in radially outwardly opening enlargements 82L and 82R, respectively, FIGURES 2 and 3. Associated respectively with the supply ports 81L and 81R are a pair of return ports 83L and 83R extending radially into the outer surface of the inner valve member 57 at locations spaced 90° circumferentially from the associated supply ports. The return ports 83L and 83R open radially outwardly at enlargements 84L and 84R respectively and communicate with a pair of axially extending return conduits 84 in the inner valve 57, which open axially into the space 56a between the left end of valve 57 and the shoulder at the base of the bore enlargement 56 to drain fluid therefrom, and also open into the space 56b within bore enlargement 56 at the right end of valve 57, which space communicates with an annular fluid return conduit 86 comprising the space between valve driving shaft 64 and driven shaft 17.

Each of the work ports 76L is associated with one of each of the supply ports 81L and return ports 83L and is arranged between these associated ports when the valve is at its neutral position shown, FIGURES 2 and 3. Similarly each of the work ports 76R is associated with one of each of the supply ports 81R and return ports 83R and is arranged between these associated ports when the valve is at the neutral position. Also when the valve spool 57 is in the neutral position illustrated in FIGURES 2 and 3, each work port 76 (L or R) is in partial communication with both its associated supply port 81 (L or R) and return port 83 (L or R), so that pressurized fluid entering the chamber 58 from conduit 59 will be discharged through the supply ports 81L and 81R into the associated work ports 76L and 76R and thence into the associated return ports 83L and 83R to the axial return ducts 84.

The work ports 76L and 76R are offset approximately 90° from each other so that rotation of the valve member 57 counterclockwise in FIGURES 2 and 3 will close the communication between the supply ports 81R and work ports 76R, and open the communication between the work ports 76R and return ports 83R. Similarly the communication between supply ports 81L and work ports 76L will be increased and the communication between work ports 76L and return ports 83L will be closed. Pressurized fluid will thus be discharged through work ports 76L into the annular flow passage 87L at the left of seal 77 between supporting sleeve 15 and shaft 18, and thence along worm 18a and through port 88 in sleeve 15 to the left side of piston 12 in cylinder 11 to drive the same from left to right, rotate worm 18a counterclockwise as viewed from the right in FIGURE 1, and swing follower 20, crank arm 25 and rock shaft 33 to effect a left turn for the vehicle. Pressurized fluid at the right side of the piston 12 will be returned as described below to the work openings 76R and discharged via return ports 83R to return conduits 84.

It is apparent from the foregoing that upon clockwise rotation of valve member 57 with respect to worm shaft 18 in FIGURES 2 and 3, the pressurized fluid will be supplied through ports 81R to openings 76R and thence to annular conduit 87R at the right of seal 77 between sleeve 15 and shaft 18 and to the right side of piston 12 in cylinder 11 to drive piston from right to left and effect a righthand turn for the vehicle. In this event, the return fluid will be discharged from the left side of piston 12 into work opening 76L and thence through ports 83L to return ducts 84 via port 88 and conduit 87L. The return flow from the right side of piston 12 when the left side of the latter is pressurized will be the reverse of the flow path described above to pressurize the right side of piston 12. Fluid from within the main body of housing 10 is also conducted freely to the left end of housing portion 10a by means of conduit 89 to prevent any dash-pot action.

The annular return conduit 86 extends axially within the bore of shaft 17 to a plurality of radial ports 90 in the latter. The ports 90 communicate radially outwardly of the shaft 17 with an annular space or chamber 91 around shaft 17 and thence with a return connection 92 adapted to be connected with a reservoir or with the inlet side of the power steering pump.

The driven shaft assembly 17, 18 is held in axial position with respect to the housing 10 by means of an annular stop or bearing race 93 abutting an annular shoulder 94 of an end closure 95 for cylinder 11 and secured in position by a nut 96 screwed into the right end of a sleeve nut 97 against a radial flange 98 integral with closure 95 and seated against the right end of housing 10, FIGURE 1. The sleeve 97 is also screwed on an externally threaded portion of housing 10 and cooperates with nut 96 in mutually interlocking relation. A suitable annular seal 99 around closure 95 prevents loss of fluid axially from cylinder 11. An annular needle bearing race 100 coaxially around shaft 17 abuts a radial shoulder 101 of closure 95 and is spaced from race 93 by a needle bearing set 102. A similar annular needle bearing set 103 around the shaft 17 spaces the race 93 from a third annular bearing race 104 maintained in axial position by a nut 105 screwed on an externally threaded portion of shaft 17 near its right end. An annular seal 106 around shaft 17 at the inner periphery of the race 93 prevents axial endwise leakage from cylinder 11 along shaft 17. In this regard the outer periphery of race 93 seats in fluid sealing engagement against a mating annular wall of closure 95 to complete the seal for the right end of cylinder 11. The space 91 at the right of the ports 90 is closed by a nut 107 which screws into the annular opening of closure 95 around shaft 17 and carries inner and outer annular seals 108 and 109 in sealing engagement with the outer periphery of shaft 17 and inner periphery of closure 95. An axial groove 110 in the inner periphery of closure 95 at the region of nut 107 provides communication between chamber 91 and the return connection 92.

Means for adjusting the angular position of the valve 57 with respect to the ports 76 (L and R) in the worm shaft 18 are illustrated in FIGURES 4, 5 and 6 wherein the diametric pin 68 is shown secured to the adjusting ring 74 and enlarged end 65a of the torsion rod 65 for rotation as a unit therewith, as for example by being pressed tightly into diametrically extending holes in these elements. Cooperable with the lost motion slots 69 in the driving shaft 64 are a pair of diametrically spaced and circumferentially elongated slots 113, FIGURE 6, in the driven shaft 17, whereby pin 68 which extends through the slots may be rotatably adjusted with respect to the driven shaft 17 about the longitudinal axis of the latter.

A pair of circumferentially spaced adjustment screws 114L and 114R are screwed radially into mating screw holes 115L and 115R in the adjustment ring 74 and into mating recesses 116L and 116R in the driven shaft 17. One side wall 117L and 117R of each recesses 116L and 116R respectively is inclined at approximately a 45° angle to the radial axis of the associated adjusting screw 114L and 114R. These walls 117L and 117R comprise cam surfaces and are mirror images of each other arranged so that upon tightening of screw 114L against the wall 117L, driven shaft 17 is urged counterclockwise in FIGURE 4, whereas upon tightening of screw 114R against cam wall 117R, driven shaft 17 is urged clockwise in FIGURE 4. In this regard, the radially inner ends of the screws 114 (L and R) are conically tapered at the same angle as the corresponding cam wall 117 (L and R).

It is apparent that by loosening one of the adjusting screws and tightening the other, the outer adjusting ring 74 can be rotated in one direction or the other relative to the driven shaft 17. By virtue of the pin 68 interconnecting ring 74 and torsion rod 65, and the connection of the latter with the valve 57 which is freely rotatable within bore 56 of the worm shaft 18, adjustment of ring 74 as aforesaid will effect angular adjustment of valve 74 and of the latter's port openings 82 (L and R) and 84 (L and R) with respect to the work ports 76 (L and R) in worm shaft 18, without affecting the tension in rod 65 or the angular position of worm 18a.

I claim:
1. In a vehicle power steering gear, manually operated rotatable driving means, driven means, a fluid operated motor for actuating said gear, rotary valve means for controlling the flow of operating fluid to said motor, torsion means, means operatively connecting said driving means and one end of said torsion means with said valve means for rotation as a unit therewith, and means for adjustably connecting the other end of said torsion means with said driven means for rotation as a unit therewith, said valve means being thereby rotatable relative to said driven means upon rotation of said driving means and deformation of said torsion means.

2. In a vehicle power steering gear according to claim 1, wherein said means for adjustably connecting said other end of said torsion means comprises connecting means fixed with respect to said other end of said torsion rod and adjustably connected to said driven means for rotation as a unit therewith, and means for adjusting the adjustable connection between said connecting means and driven means.

3. In the combination according to claim 2, said driven means and means for adjusting having annular elements coaxial with said other end of said torsion means, said connecting means comprising a pin extending radially of the axis of said coaxial elements through a circumferentially extending lost motion slot in the element of said driven means to enable limited rotational adjusting movement of said pin about the axis of said coaxial elements, said pin also extending through said other end of said torsion rod and the element of said means for adjusting to connect the same together for rotation as a unit, and a pair of circumferentially spaced screws adjustably screwed radially through one of said coaxial elements into recesses in the other of said elements, each recess being defined in part by a cam wall of the associated element, the end of each screw within each recess seating against the cam wall of that recess, the cam walls of the two recesses being mirror images of each other, each screw cooperating with the end of the screw seated thereat to cam the element of said means for adjusting circumferentially upon tightening of that screw, thereby to rotatably adjust the latter element with respect to said driven means upon tightening of one of said screws and loosening of the other.

4. In the combination according to claim 1, said driven means including a rotatable tubular driven shaft having said valve means rotatable coaxially therein, said driving means including a rotatable tubular driving shaft extending coaxially within said driven shaft, said torsion means comprising a torsion rod extending coaxially within said driving shaft, said driving shaft and one end of said torsion rod being operatively connected with said valve means for rotation as a unit therewith, the other end of said torsion rod being adjustably connected by said means for adjustably connecting with said driven means for rotation as a unit therewith.

5. In the combination according to claim 4, said means for adjustably connecting including a rotatably adjustable ring coaxial with said driven shaft, a pin extending radially of the axis of said driven shaft through a circumferentially extending lost motion slot in said driven shaft to enable limited rotational adjusting movement of said pin about the axis of said driven shaft, said pin also extending radially through said other end of said torsion rod and said adjustable ring to connect the same for rotation as a unit, and a pair of circumferentially spaced screws adjustably screwed radially through one of the coaxial elements comprising said ring and driven means into recesses in the other of said elements, each recess being defined in part by a cam wall of the associated element, the end of each screw within each recess seating against the cam wall of that recess, the cam walls of the two recesses being mirror images of each other and each cooperating with the end of the screw seated thereat to cam said ring circumferentially with respect to said driven shaft upon tightening of one of said screws and loosening of the other.

6. In the combination according to claim 5, said adjustable ring being located coaxially around said driven shaft, said screws being screwed radially into said ring, and said recesses being located in said driven shaft.

7. In the combination according to claim 6, said driven shaft having fluid ports extending radially therethrough at the region of said valve means and cooperating with the latter for selectively directing said operating fluid to said motor upon angular displacement of said valve means relative to said driven shaft, a worm comprising a coaxial extension of said driven shaft, and follower means operatively connected with said worm for actuation thereby.

No references cited.

MILTON KAUFMAN, *Primary Examiner.*